(12) United States Patent
Hart et al.

(10) Patent No.: US 9,559,769 B2
(45) Date of Patent: Jan. 31, 2017

(54) COMMUNICATION SYSTEMS

(75) Inventors: Michael John Beems Hart, London (GB); Yuefeng Zhou, Haywards Heath (GB)

(73) Assignee: Fujitsu Limited, Kawasaki (JP)

( * ) Notice: Subject to any disclaimer, the term of this patent is extended or adjusted under 35 U.S.C. 154(b) by 1011 days.

(21) Appl. No.: 11/851,430

(22) Filed: Sep. 7, 2007

(65) Prior Publication Data

US 2008/0062908 A1 Mar. 13, 2008

(30) Foreign Application Priority Data

Sep. 8, 2006 (GB) .................................. 0617752.1

(51) Int. Cl.
| | |
|---|---|
| H04B 7/26 | (2006.01) |
| H04B 7/155 | (2006.01) |
| H04W 72/04 | (2009.01) |
| H04W 84/04 | (2009.01) |

(52) U.S. Cl.
CPC ............ *H04B 7/2606* (2013.01); *H04B 7/155* (2013.01); *H04W 72/0406* (2013.01); *H04W 84/047* (2013.01)

(58) Field of Classification Search
CPC .. H04B 7/155; H04B 7/2606; H04W 72/0406; H04W 84/047
USPC .................................. 455/7, 9, 11.1, 13.1, 16
See application file for complete search history.

(56) References Cited

U.S. PATENT DOCUMENTS

| | | |
|---|---|---|
| 5,719,868 A | 2/1998 | Young |
| 6,370,384 B1 | 4/2002 | Komara |
| 6,701,129 B1 | 3/2004 | Hashem et al. |
| 7,096,274 B1 | 8/2006 | Ci et al. |
| 2002/0080816 A1 | 6/2002 | Spinar et al. |
| 2003/0054771 A1 | 3/2003 | Chappaz |

(Continued)

FOREIGN PATENT DOCUMENTS

| | | |
|---|---|---|
| EP | 0 151 280 | 12/1984 |
| EP | 1482751 A2 | 12/2004 |

(Continued)

OTHER PUBLICATIONS

Communication from the European Patent Office, European Search Report for Application No. EP 07 11 3538, Dec. 27, 2007, 7 pages.

(Continued)

*Primary Examiner* — Mehmood B Khan
(74) *Attorney, Agent, or Firm* — Baker Botts L.L.P.

(57) ABSTRACT

A transmission method for use in a wireless communication system is provided. The system includes a source apparatus, a destination apparatus and an intermediate apparatus, where the source apparatus and destination apparatus are arranged to transmit and receive information via the intermediate apparatus, and where at least the source apparatus is arranged to perform a network entry process in order to connect to the system. The includes, in the intermediate apparatus, determining whether the source apparatus has initiated a network entry process with the intermediate apparatus and if so, notifying the destination apparatus thereof while continuing to conduct the network entry process with the source apparatus. The method also includes, in the destination apparatus, responding to said notification with a return message to the intermediate apparatus, said return message being used to facilitate completion of the network entry process.

13 Claims, 5 Drawing Sheets

(56) References Cited

U.S. PATENT DOCUMENTS

| | | | |
|---|---|---|---|
| 2004/0005861 A1 | 1/2004 | Tauchi | |
| 2004/0100929 A1 | 5/2004 | Garcia-Luna-Aceves | |
| 2004/0109428 A1 | 6/2004 | Krishnamurthy | |
| 2005/0030887 A1 | 2/2005 | Jacobsen et al. | |
| 2005/0048914 A1 | 3/2005 | Sartori et al. | |
| 2006/0023745 A1 | 2/2006 | Koo et al. | |
| 2006/0252367 A1* | 11/2006 | Haartsen | H04B 7/2606 455/11.1 |
| 2006/0256741 A1 | 11/2006 | Nozaki | |
| 2006/0264172 A1* | 11/2006 | Izumikawa | H04W 72/1278 455/11.1 |
| 2007/0002766 A1 | 1/2007 | Park et al. | 370/254 |
| 2007/0072604 A1* | 3/2007 | Wang | H04B 7/155 455/428 |
| 2007/0201392 A1 | 8/2007 | Ramachandran | |
| 2007/0298778 A1* | 12/2007 | Chion | H04W 72/005 455/422.1 |
| 2008/0002741 A1* | 1/2008 | Maheshwari | H04B 7/155 370/473 |
| 2008/0031180 A1* | 2/2008 | Hsieh | H04B 7/2606 370/315 |
| 2008/0031181 A1* | 2/2008 | Tsai | H04B 7/2606 370/315 |
| 2008/0031182 A1* | 2/2008 | Maheshwari | H04B 7/155 370/320 |
| 2008/0031197 A1* | 2/2008 | Wang | H04B 7/15542 370/331 |
| 2008/0039014 A1* | 2/2008 | Tsai | H04W 72/0466 455/17 |
| 2008/0039016 A1* | 2/2008 | Bonta | H04B 7/2606 455/41.2 |
| 2008/0049678 A1* | 2/2008 | Chindapol | H04B 7/2606 370/331 |
| 2008/0130549 A1* | 6/2008 | Chindapol | H04W 40/24 370/315 |
| 2008/0285499 A1* | 11/2008 | Zhang | H04B 7/155 370/315 |
| 2008/0285500 A1* | 11/2008 | Zhang | H04B 7/15507 370/315 |
| 2008/0285501 A1* | 11/2008 | Zhang | H04L 45/20 370/315 |
| 2008/0291847 A1* | 11/2008 | Zheng | H04L 45/26 370/255 |
| 2009/0073916 A1* | 3/2009 | Zhang | H04B 7/15542 370/315 |
| 2009/0303895 A1* | 12/2009 | Zhang | H04B 7/2606 370/252 |
| 2009/0307484 A1* | 12/2009 | Zhang | H04W 12/02 713/153 |

FOREIGN PATENT DOCUMENTS

| | | |
|---|---|---|
| EP | 1 617 693 | 1/2006 |
| EP | 1 635 592 | 3/2006 |
| EP | 1 677 443 | 7/2006 |
| EP | 1 804 430 A1 | 7/2007 |
| WO | WO 99/44341 | 9/1999 |
| WO | WO 01/76289 | 10/2001 |
| WO | WO 03/058984 | 7/2003 |
| WO | WO 2004/056013 | 7/2004 |
| WO | WO 2004/107693 | 12/2004 |
| WO | WO 2005/067173 | 7/2005 |
| WO | WO 2006/012554 | 2/2006 |
| WO | WO 2006/065069 | 6/2006 |
| WO | WO 2006/098608 | 9/2006 |
| WO | WO 2006/120161 | 11/2006 |

OTHER PUBLICATIONS

Communication from the European Patent Office, European Search Report for Application No. EP 07113557.8-1525, Dec. 3, 2007, 7 pages.

The Patent Office, Search Report under Section 17, U.K. Application No. GB0616482, date of search Oct. 27, 2006, 1 page.

The Patent Office, Search Report under Section 17, U.K. Application No. GB0616471, date of search Oct. 27, 2006, 1 page.

The Patent Office, Search Report under Section 17, U.K. Application No. GB0616477, date of search Oct. 27, 2006, 1 page.

The Patent Office, Search Report under Section 17, U.K. Application No. GB0616472, date of search Nov. 3, 2006, 1 page.

The Patent Office, Search Report under Section 17, U.K. Application No. 0616479, date of search Oct. 27, 2006, 1 page.

The Patent Office, Search Report under Section 17, U.K. Application No. 0622124, date of search Dec. 7, 2006, 1 page.

The Patent Office, Search Report under Section 17, U.K. Application No. 0622122, date of search Nov. 28, 2006, 1 page.

IEEE Computer Society, "IEEE Standards for Information Technology, 803.11g™," Part 11: Wireless LAN Medium Access Control (MAC) and Physical Layer (PHY) Specifications, Amendment 4: Further Higher Data Rate Extension in the 2.4 GHz Band, Jun. 27, 2003, 78 pages.

Hart et al., "Relay Midamble," IEEE 802.16 Broadband Wireless Access Working Group <http://ieee802.org/16>, pp. 0-3, Nov. 6, 2006.

Hart et al., "Frame Structure for Multihop Relaying Support," IEEE 802.16 Broadband Wireless Access Working Group < http://ieee802.org/16>, IEE C80216j/138, ieee 802.16 meeting #46, pp. 0-9, Nov. 2006.

Hart et al., >, "TDD MR Frame Structure," IEEE 802.16 Broadband Wireless Access Working Group < http://ieee802.org/16>, pp. 1-10, Oct. 20, 2006.

Hart, "Dimensioning and System Level Analysis of an HSDPA Network with Relaying Nodes," 5 pages, 2005

Chu, "Polyphase Codes with Good Periodic Correlation Properties," IEEE Transactions on Information Theory, Jul. 1972, pp. 531-532, Jul. 1972.

Frank et al., "Phase Shift Pulse Codes with Good Periodic Correlation Properties," IRE Transactions on Information Theory, pp. 381-382, Oct. 1962.

Milewski, "Periodic Sequences with Optimal Properties for Channel Estimation and Fast Start-Up Equalization," IBM Research and Development Journal, pp. 426-431, Sep. 1983.

Hart, "Optimal Transmit Power Balancing in Multi-Hop Networks," Fujitsu Laboratories of Europe, Ltd., 6 pages, 2005.

Golay, "Multi-Slit Spectrometry," Journal of the Optical Society of America, vol. 39, No. 6, pp. 437-444, Jun. 1949.

Golay, "Complementary Series," IRE Transactions on Information Theory, IT 7, pp. 82-87, Apr. 1961.

Zhou et al., "Communication Systems," Pending U.S. Appl. No. 11/840,492, filed Aug. 17, 2007.

Zhou et al., "Communication Systems," Pending U.S. Appl. No. 11/840,518, filed Aug. 17, 2007.

Hart et al., "Communication Systems," Pending U.S. Appl. No. 11/840,546, filed Aug. 17, 2007.

Hart et al., "Communication Systems," Pending U.S. Appl. No. 11/840,570, filed Aug. 17, 2007.

Zhou et al., "Communication Systems," Pending U.S. Appl. No. 11/840,595, filed Aug. 17, 2007.

Hart et al., "Communication Systems," Pending U.S. Appl. No. 11/840,621, filed Aug. 17, 2007.

Hart et al., "Communication Systems," Pending U.S. Appl. No. 11/840,644, filed Aug. 17, 2007.

Hart et al., "Communication Systems," Pending U.S. Appl. No. 11/840,669, filed Aug. 17, 2007.

Hart et al., "Communication Systems," Pending U.S. Appl. No. 11/840,429, filed Sep. 7, 2007.

Hart et al., "Communication Systems," Pending U.S. Appl. No. 11/840,430, filed Sep. 7, 2007.

Hart et al., "Wireless Communication Systems," Pending U.S. Appl. No. 11/856,139, filed Sep. 17, 2007.

Hart et al., "Wireless Communication Systems," Pending U.S. Appl. No. 11/856,145, filed Sep. 17, 2007.

(56) References Cited

OTHER PUBLICATIONS

Hart et al., "Communication Systems," Pending U.S. Appl. No. 11/856,178, filed Sep. 17, 2007.
European Patent Office, European Search Report for Application No. EP 08 15 5435, Aug. 1, 2008, 8 pages.
European Patent Office, European Search Report for Application No. EP 07 11 3483, Sep. 26, 2007, 6 pages.
IEEE Computer Society, IEEE Standard for Local and Metropolitan Area Networks, Part 16: Air Interface for Fixed Broadband Wireless Access Systems—Amendment 2: Medium Access Control Modifications and Additional Physical Layer Specifications for 2-11 GHz, Apr. 1, 2003, p. 1, 19, 68-70, and 80-87.
Hart et al., "Factors That Affect Performance of a Mobile Multihop Relay System," IEEE 802.16 Presentation Submission Template (Rev.8.3), Sep. 13, 2005, 19 pages.
Relay Task Group of IEEE 802.16, "Part 16: Air Interface for Fixed and Mobile Broadband Wireless Access Systems," Multihop Relay Specification, p. 1-12 and 78-104, Jun. 6, 2007.
The Patent Office, Search Report under Section 17, U.K. Application No. GB0617752.1, date of search Aug. 28, 2006, 1 page.
Communication from the European Patent Office, European Search Report for Application No. EP 08 15 8421, Oct. 21, 2008, 1 pages.
Communication from the European Patent Office, European Search Report for Application No. EP 07 11 3481, Oct. 19, 2007, 1 pages.
Kaneko et al., "Proposed Relay Method with P-MP Structure of IEEE802.16-2004," 2005 IEEE 16th International Symposium on Personal, Indoor and Mobile Radio Communications, pp. 1606-1610, Sep. 11, 2005 through Sep. 14, 2005.
Hoymann et al., "Multihop Communication in Relay Enhanced IEEE 802.16 Networks," The 17th Annual IEEE International Symposium on Personal, Indoor and Mobile Radio Communications, 5 pages, Sep. 1, 2006.
Etri et al, Transmission of IP Packets over Ethernet over IEEE 802.16, draft-riegel-l6ng-ip-over-eth-over-80216-01.txt, Oct. 1, 2006, pp. 1-16.
Kim et al., Fair and Efficient Multihop Scheduling Algorithm for IEEE 802.16 BWA Systems, pp. 895-901, Oct. 3-7, 2005.
Japanese Office Action with English Translation; Application No. 2007-228359; pp. 7, Jan. 17, 2012.
Japanese Office Action with English Translation; Application No. 2010-119396; pp. 7, Jan. 17, 2012.
Saitoh, et al., "A proxy request method for IEEE802.16 relayed terminal", Proceedings of General Convention of the Institute of Electronics, Information and Communication Engineers, p. 491 (B-5-138), Mar. 8, 2006.
United States Office Action; U.S. Appl. No. 12/606,753; pp. 11, Nov. 7, 2013.
U.S. Office Action issued in U.S. Appl. No. 12/606,753; 15 pages, Apr. 8, 2015.

\* cited by examiner

COMMUNICATION SYSTEMS

RELATED APPLICATION

This application claims foreign priority benefits under 35 U.S.C. §119 of United Kingdom Application No. GB 0617752.1, filed on Sep. 8, 2006, entitled "Communication Systems".

TECHNICAL FIELD

This invention relates in general to communication systems, and more particularly to a network entry procedure.

Overview

Currently there exists interest in the use of multihop techniques in packet based radio and other communication systems, where it is purported that such techniques will enable both extension in coverage range and increase in system capacity (throughput).

In a multi-hop communication system, communication signals are sent in a communication direction along a communication path from a source apparatus to a destination apparatus via one or more intermediate apparatuses. FIG. 1 illustrates a single-cell two-hop wireless communication system comprising a base station BS (known in the context of 3G communication systems as "node-B" NB), a relay node RN (also known as a relay station RS), and an item of user equipment UE (also known as a mobile station MS or subscriber station SS; below, the abbreviation MS or MS/SS is used to denote either of these types of UE). In the case where signals are being transmitted on the downlink (DL) from a base station to a destination user equipment (UE) via the relay node (RN), the base station comprises the source station (S) and the user equipment comprises the destination station (D). In the case where communication signals are being transmitted on the uplink (UL) from the user equipment (UE), via the relay node, to the base station, the user equipment comprises the source station and the base station comprises the destination station. The latter form of communication includes signals transmitted by the user equipment to identify itself to the base station (and hence to the network) as part of a network entry procedure. This is explained below.

The relay node is an example of intermediate apparatus and comprises: a receiver, operable to receive data from the source apparatus; and a transmitter, operable to transmit this data, or a derivative thereof, to the destination apparatus.

Simple analogue repeaters or digital repeaters have been used as relays to improve or provide coverage in dead spots. They can either operate in a different transmission frequency band from the source station to prevent interference between the source transmission and the repeater transmission, or they can operate at a time when there is no transmission from the source station.

FIG. 2 illustrates a number of applications for relay stations. For fixed infrastructure, the coverage provided by a relay station may be "in-fill" to allow access to the communication network for mobile stations which may otherwise be in the shadow of other objects or otherwise unable to receive a signal of sufficient strength from the base station despite being within the normal range of the base station. "Range extension" is also shown, in which a relay station allows access when a mobile station is outside the normal data transmission range of a base station. One example of in-fill shown at the top right of FIG. 2 is positioning of a nomadic relay station to allow penetration of coverage within a building that could be above, at, or below ground level.

Other applications are nomadic relay stations which are brought into effect for temporary cover, providing access during events or emergencies/disasters. A final application shown in the bottom right of FIG. 2 provides access to a network using a relay positioned on a vehicle.

Relays may also be used in conjunction with advanced transmission techniques to enhance gain of the communications system as explained below.

It is known that the occurrence of propagation loss, or "pathloss", due to the scattering or absorption of a radio communication as it travels through space, causes the strength of a signal to diminish. Factors which influence the pathloss between a transmitter and a receiver include: transmitter antenna height, receiver antenna height, carrier frequency, clutter type (urban, sub-urban, rural), details of morphology such as height, density, separation, terrain type (hilly, flat). The pathloss L (dB) between a transmitter and a receiver can be modeled by:

$$L = b + 10n \log d \quad (A)$$

Where d (meters) is the transmitter-receiver separation, b(db) and n are the pathloss parameters and the absolute pathloss is given by $l=10^{(L/10)}$.

The sum of the absolute path losses experienced over the indirect link SI+ID may be less than the pathloss experienced over the direct link SD. In other words it is possible for:

$$L(SI) + L(ID) < L(SD) \quad (B)$$

Splitting a single transmission link into two (or more) shorter transmission segments therefore exploits the non-linear relationship between pathloss verses distance. From a simple theoretical analysis of the pathloss using equation (A), it can be appreciated that a reduction in the overall pathloss (and therefore an improvement, or gain, in signal strength and thus data throughput) can be achieved if a signal is sent from a source apparatus to a destination apparatus via intermediate apparatus (one or more relay nodes), rather than being sent directly from the source apparatus to the destination apparatus. If implemented appropriately, multi-hop communication systems can allow for a reduction in the transmit power of transmitters which facilitate wireless transmissions, leading to a reduction in interference levels as well as decreasing exposure to electromagnetic emissions. Alternatively, the reduction in overall pathloss can be exploited to improve the received signal quality at the receiver without an increase in the overall radiated transmission power required to convey the signal.

Multi-hop systems are suitable for use with multi-carrier transmission. In a multi-carrier transmission system, such as FDM (frequency division multiplex), OFDM (orthogonal frequency division multiplex) or DMT (discrete multi-tone), a single data stream is modulated onto N parallel sub-carriers, each sub-carrier signal having its own frequency range. This allows the total bandwidth (i.e. the amount of data to be sent in a given time interval) to be divided over a plurality of sub-carriers thereby increasing the duration of each data symbol. Since each sub-carrier has a lower information rate, multi-carrier systems benefit from enhanced immunity to channel induced distortion compared with single carrier systems. This is made possible by ensuring that the transmission rate and hence bandwidth of each subcarrier is less than the coherence bandwidth of the channel. As a result, the channel distortion experienced on a signal subcarrier is frequency independent and can hence be corrected by a simple phase and amplitude correction factor. Thus the channel distortion correction entity within a multicarrier receiver can be of significantly lower complexity than its counterpart within a single carrier receiver when the system bandwidth is in excess of the coherence bandwidth of the channel.

Orthogonal frequency division multiplexing (OFDM) is a modulation technique that is based on FDM. An OFDM system uses a plurality of sub-carrier frequencies which are orthogonal in a mathematical sense so that the sub-carriers' spectra may overlap without interference due to the fact they are mutually independent. The orthogonality of OFDM systems removes the need for guard band frequencies and thereby increases the spectral efficiency of the system. OFDM has been proposed and adopted for many wireless systems. It is currently used in Asymmetric Digital Subscriber Line (ADSL) connections, in some wireless LAN applications (such as WiFi devices based on the IEEE 802.11a/g standard), and in wireless MAN applications such as WiMAX (based on the IEEE 802.16 standard). OFDM is often used in conjunction with channel coding, an error correction technique, to create coded orthogonal FDM or COFDM. COFDM is now widely used in digital telecommunications systems to improve the performance of an OFDM based system in a multipath environment where variations in the channel distortion can be seen across both subcarriers in the frequency domain and symbols in the time domain. The system has found use in video and audio broadcasting, such as DVB and DAB, as well as certain types of computer networking technology.

In an OFDM system, a block of N modulated parallel data source signals is mapped to N orthogonal parallel sub-carriers by using an Inverse Discrete or Fast Fourier Transform algorithm (IDFT/IFFT) to form a signal known as an "OFDM symbol" in the time domain at the transmitter. Thus, an "OFDM symbol" is the composite signal of all N sub-carrier signals. An OFDM symbol can be represented mathematically as:

$$x(t) = \frac{1}{\sqrt{N}} \sum_{n=0}^{N-1} c_n \cdot e^{j2\pi n \Delta f t}, 0 \leq t \leq T_s \quad (1)$$

where $\Delta f$ is the sub-carrier separation in Hz, $T_s = 1/\Delta f$ is symbol time interval in seconds, and $c_n$ are the modulated source signals. The sub-carrier vector in (1) onto which each of the source signals is modulated $c \in C_n$, $c = (c_0, c_1 \ldots c_{N-1})$ is a vector of N constellation symbols from a finite constellation. At the receiver, the received time-domain signal is transformed back to frequency domain by applying Discrete Fourier Transform (DFT) or Fast Fourier Transform (FFT) algorithm.

OFDMA (Orthogonal Frequency Division Multiple Access) is a multiple access variant of OFDM. It works by assigning a subset of sub-carriers to an individual user. This allows simultaneous transmission from several users leading to better spectral efficiency. However, there is still the issue of allowing bi-directional communication, that is, in the uplink and download directions, without interference.

In order to enable bi-directional communication between two nodes, two well known different approaches exist for duplexing the two (forward or download and reverse or uplink) communication links to overcome the physical limitation that a device cannot simultaneously transmit and receive on the same resource medium. The first, frequency division duplexing (FDD), involves operating the two links simultaneously but on different frequency bands by subdividing the transmission medium into two distinct bands, one for forward link and the other for reverse link communications. The second, time division duplexing (TDD), involves operating the two links on the same frequency band, but subdividing the access to the medium in time so that only the forward or the reverse link will be utilizing the medium at any one point in time. Both approaches (TDD & FDD) have their relative merits and are both well used techniques for single hop wired and wireless communication systems. For example the IEEE 802.16 standard incorporates both an FDD and TDD mode. IEEE std 802.16-2004 "Air Interface for Fixed Broadband Wireless Access Systems" is hereby incorporated by reference in its entirety.

In a single-hop communication system in which communication takes place directly between an MS/SS and a BS, a network entry procedure is followed by the MS/SS in conjunction with the BS. However, the known network entry procedure is not sufficient for a multi-hop system in which communication between the BS and MS/SS takes place via one or more relay stations RS. There is consequently a need for an improved network entry procedure applicable in such a case.

SUMMARY OF EXAMPLE EMBODIMENTS

According to one embodiment of the present invention, there is provided a transmission method for use in a wireless communication system. The system includes a source apparatus, a destination apparatus and an intermediate apparatus, where the source apparatus and destination apparatus are arranged to transmit and receive information via the intermediate apparatus, and where at least the source apparatus is arranged to perform a network entry process in order to connect to the system. The includes, in the intermediate apparatus, determining whether the source apparatus has initiated a network entry process with the intermediate apparatus and if so, notifying the destination apparatus thereof while continuing to conduct the network entry process with the source apparatus. The method also includes, in the destination apparatus, responding to said notification with a return message to the intermediate apparatus, said return message being used to facilitate completion of the network entry process.

Particular embodiments of the invention may provide a communication method, communication system and intermediate apparatus (e.g., relay stations RS) employing a novel protocol adopted as a network entry procedure followed by the BS and RS, to enable entry of a legacy MS or SS into a relaying enabled communication network. The protocol involves decentralized control where the RS can manage the entire process. The protocol of particular embodiments is based on an adaptation of the current network entry procedure followed in the IEEE 802.16 standard and is specifically designed for the case when a RS transmits synchronization and broadcast control information (i.e. preamble and MAP).

BRIEF DESCRIPTION OF THE DRAWINGS

For a more complete understanding of the present invention and its advantages, reference is now made to the following description, taken in conjunction with the accompanying drawings, in which.

DETAILED DESCRIPTION

In legacy single hop systems (e.g. 802.16-2004 and 802.16e-2005), standard network entry procedures already exist to support entry of an MS or SS into a communication network. However, when the network is modified to support relaying functionality, of which a legacy MS or SS has no knowledge, a modified network entry procedure is required from the network point of view to facilitate fast and efficient support of MS/SS network entry.

Particular embodiments of the invention provide a protocol that is intended to be adopted as the modified network entry procedure from the network point of view, i.e. adopted in the RS and BS. In particular, particular embodiments are designed with application to the IEEE 802.16 standard in mind and requires no changes to the procedure from the MS or SS point of view. Particular embodiments are also designed for the case of non-transparent relaying where the RS is able to transmit a preamble and broadcast control information and hence has the capability to manage the process locally (i.e. distributed control) and hence minimize the latency that would otherwise be associated with relaying.

Figure 1:
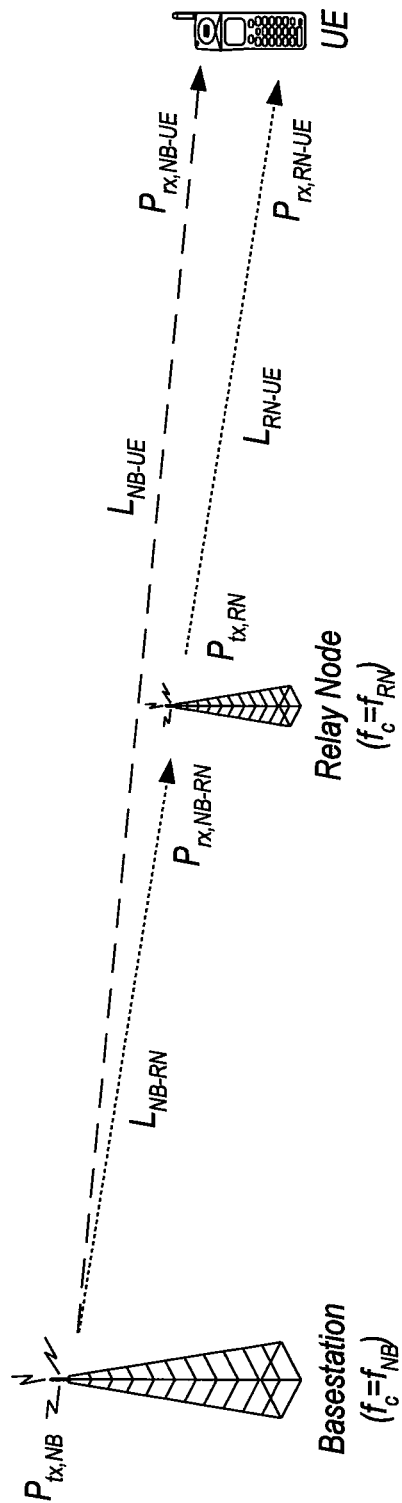
FIG. 1 shows a single-cell two-hop wireless communication system.
Figure 2A:
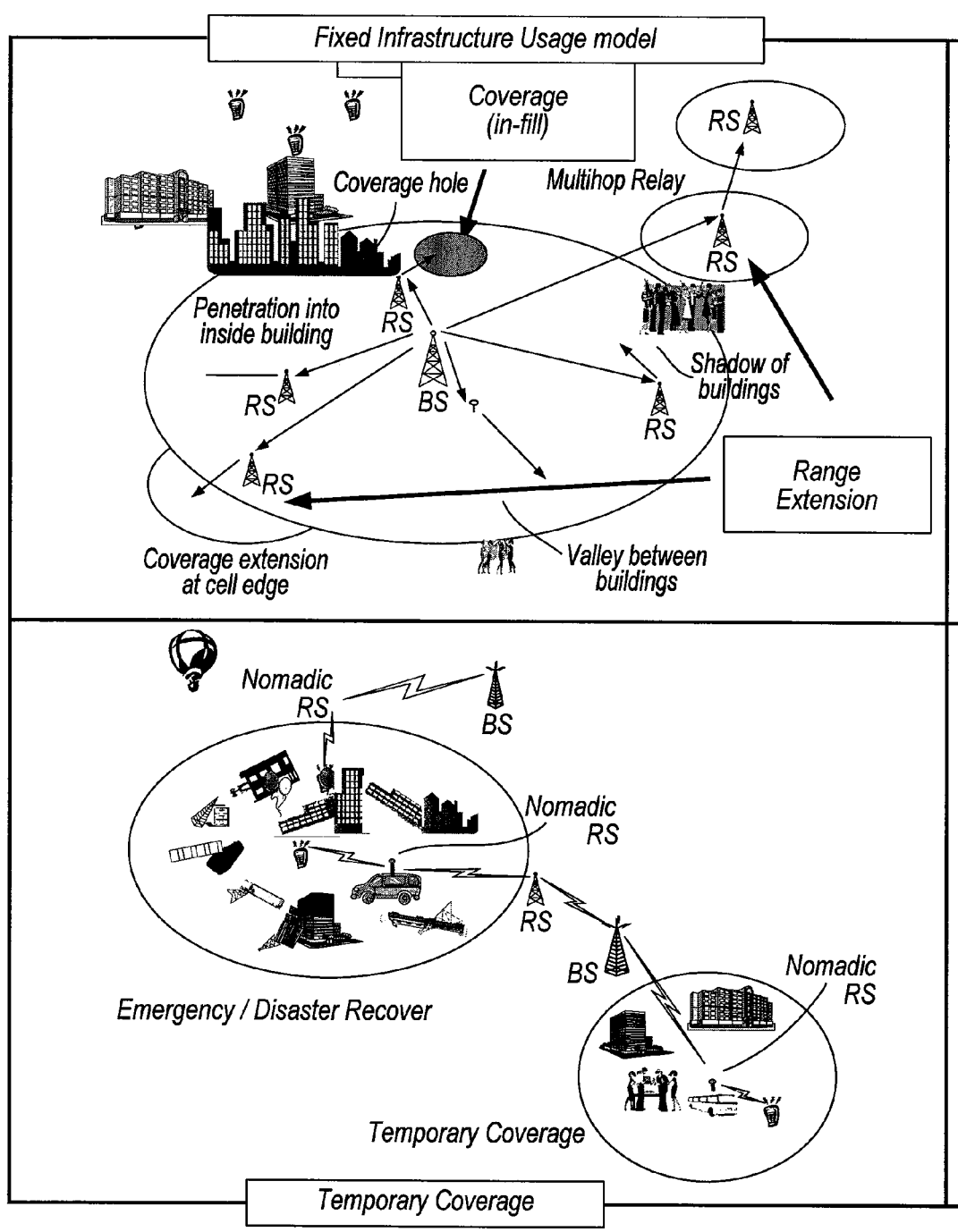
FIG. 2 shows applications of relay stations RS.
Figure 2B:
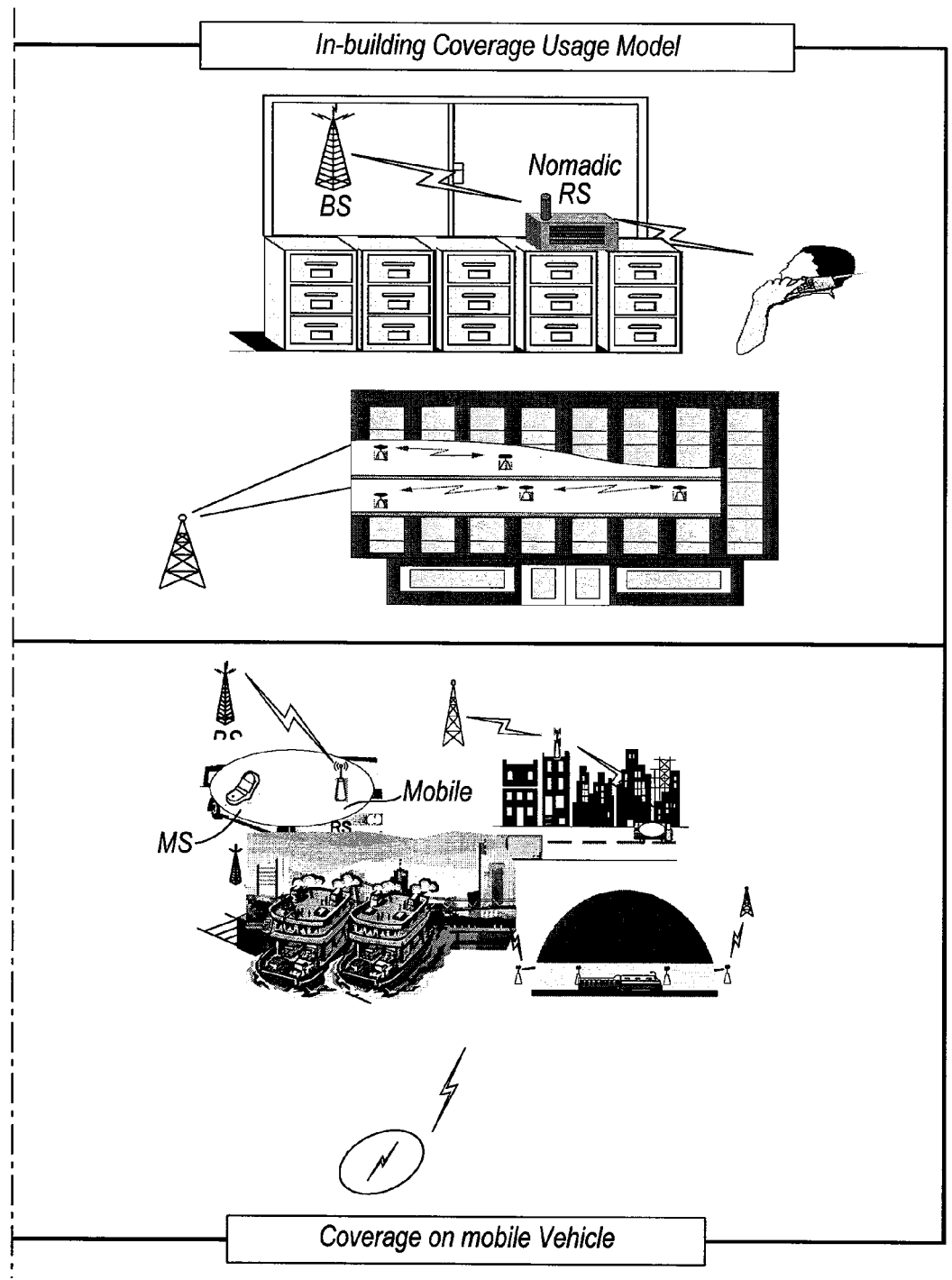
Figure 3:
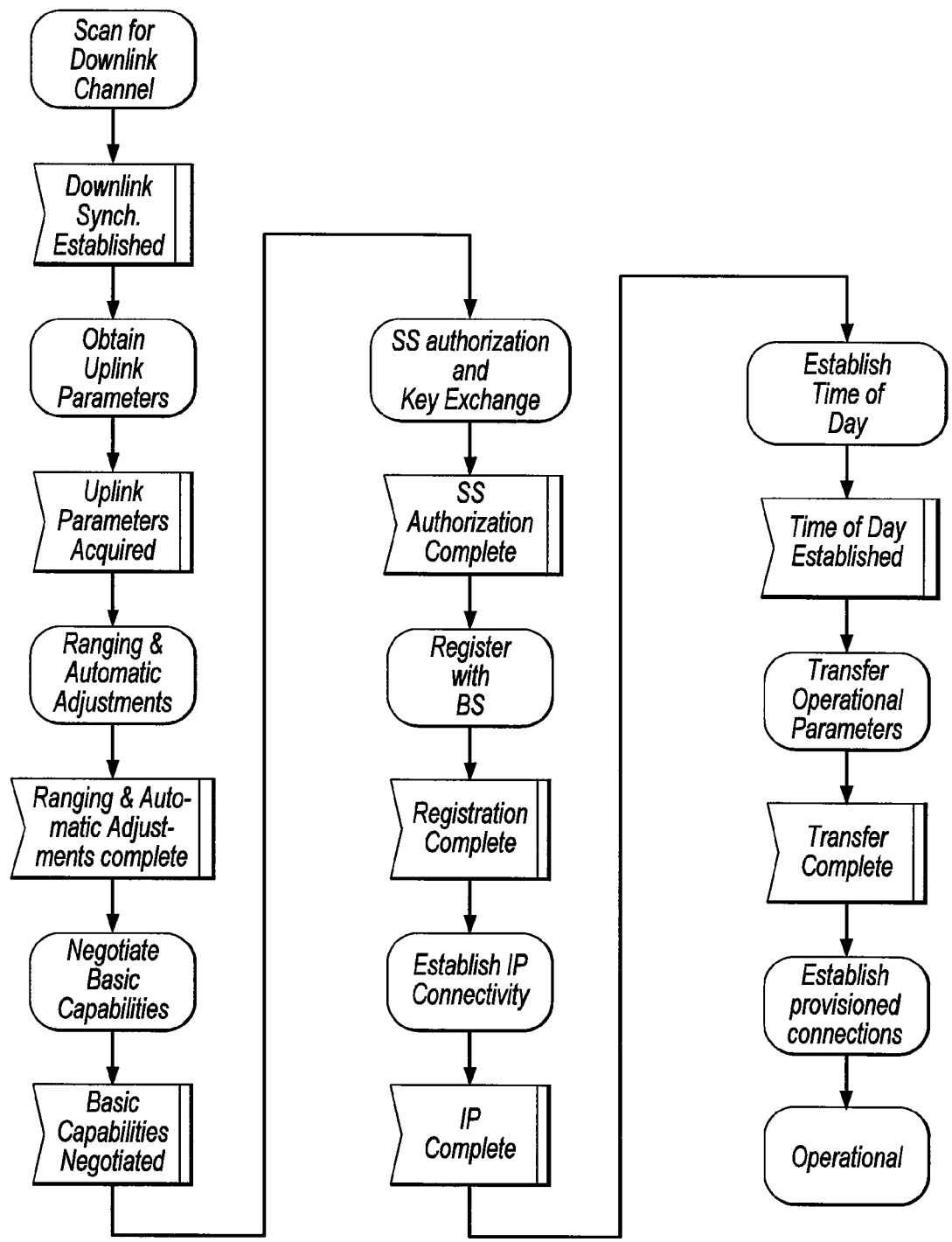
FIG. 3 shows standard MS network entry procedure.

FIG. 3 illustrates the network entry procedure described in the IEEE 802.16 standard which supports network entry of an MS or SS into a single-hop communication system. Here, it is assumed that any RS with which the MS is communicating during the network entry procedure is already known to the network (incidentally, in this specification, the terms "network" and "system" are used interchangeably). For example, the RS may have already completed entry into the network following a separate procedure, such as the one described in the applicant's UK Patent Application No. 0616475.0. It is also assumed that, as the network is required to support legacy users, the MS or SS still follows the same network entry procedure from its point of view, as illustrated in FIG. 3. However, the procedure followed by the RS is defined here and the one followed by the BS is modified from that followed for the case of a single hop network. For ease of explanation, a two-hop configuration as in FIG. 1 will be considered although the present invention is not limited to this.

Scan for Downlink Channel

During this stage the MS/SS scans for preamble transmissions which may be originating from either BSs or RSs. Once all potential preambles are detected, the MS will select which channel it wishes to use from the available set of channels, in line with the standard procedure. It will then synchronize its receiver with the transmitter. Note that no additional operations are required beyond those in the existing single hop system.

Obtain Uplink Parameters

During this stage the MS/SS obtains uplink parameters which includes location of the uplink control information transmission region that will be used by the MS/SS in the next stage. This information will be generated by the BS or RS that the MS/SS is attempting to connect to.

Ranging & Automatic Adjustments

The MS/SS will transmit a ranging code or ranging message, as defined in the IEEE 802.16 standard, as a form of identification information to identify itself to the network.

(Incidentally, the term "ranging message" is more correct when OFDM is being used, and "ranging code" more appropriate to OFDMA, but in the following description "ranging code" is used for both). It is possible that a number of receivers in the multi-hop network receive this transmission. This code will be directed towards the preferred receiver based on the downlink channel selected.

The receiver of the ranging code will then generally attempt to detect the ranging code independently as the RS appears like a BS to the MS. However, as it is likely that the RS will need to ensure that the BS and the BS to RS air interface can support this new connection, some mechanism will be needed within the system to facilitate this. Three alternative such mechanisms are:

1. The ranging request is relayed back to the BS from the RS, setting the transmission power accordingly; or the detection is performed in RS but detection information is relayed to the BS. However, due to the frame structure associated with this type of system and the fact that any response messages are required to come via the RS, both of these approaches will incur extra latency from the view point of the MS/SS. Hence this method is not preferred for a performance point of view, however it keeps the complexity to a minimum in the RS so is advantageous in this sense.

2. The BS informs the RS of a detection threshold and the RS manages the ranging process until the threshold is met, generating any feedback information locally. However, the final ranging response with the completion method still has to be relayed from the BS, incur some extra latency. This method provides a lower latency solution with the requirements of increased complexity when compared with the mechanism proposed in 1.

3. The RS completely manages the ranging process locally. However, to ensure that the BS can support the connection, as soon as it has knowledge of the MS attempting to enter the network through detecting the ranging code for the first time, it then informs the BS that a user is attempting network entry. While the RS manages the ranging process, it effectively pipelines in parallel a second "ranging process" relating to this connection over the RS to BS link, thereby minimizing latency. This second "ranging process" is a process conducted by the RS with the BS on behalf of the MS, and does not require a ranging code of its own. The BS will then inform the RS whether the connection can be supported, and also inform the RS of any specific information regarding the connection type, service level, etc that can be offered over the composite link. The RS can then interpret the information, passing on any relevant elements to the MS/SS, or use it to determine whether to continue with the ranging process. The RS may also request specific information from the BS that it will require to include in its successful ranging or any continue ranging message. This third mechanism is preferred in terms of network performance due to the fact it provides highest efficiency by running the ranging and network entry process over the two links independently, however it requires greatest complexity in the RS.

Figure 4:
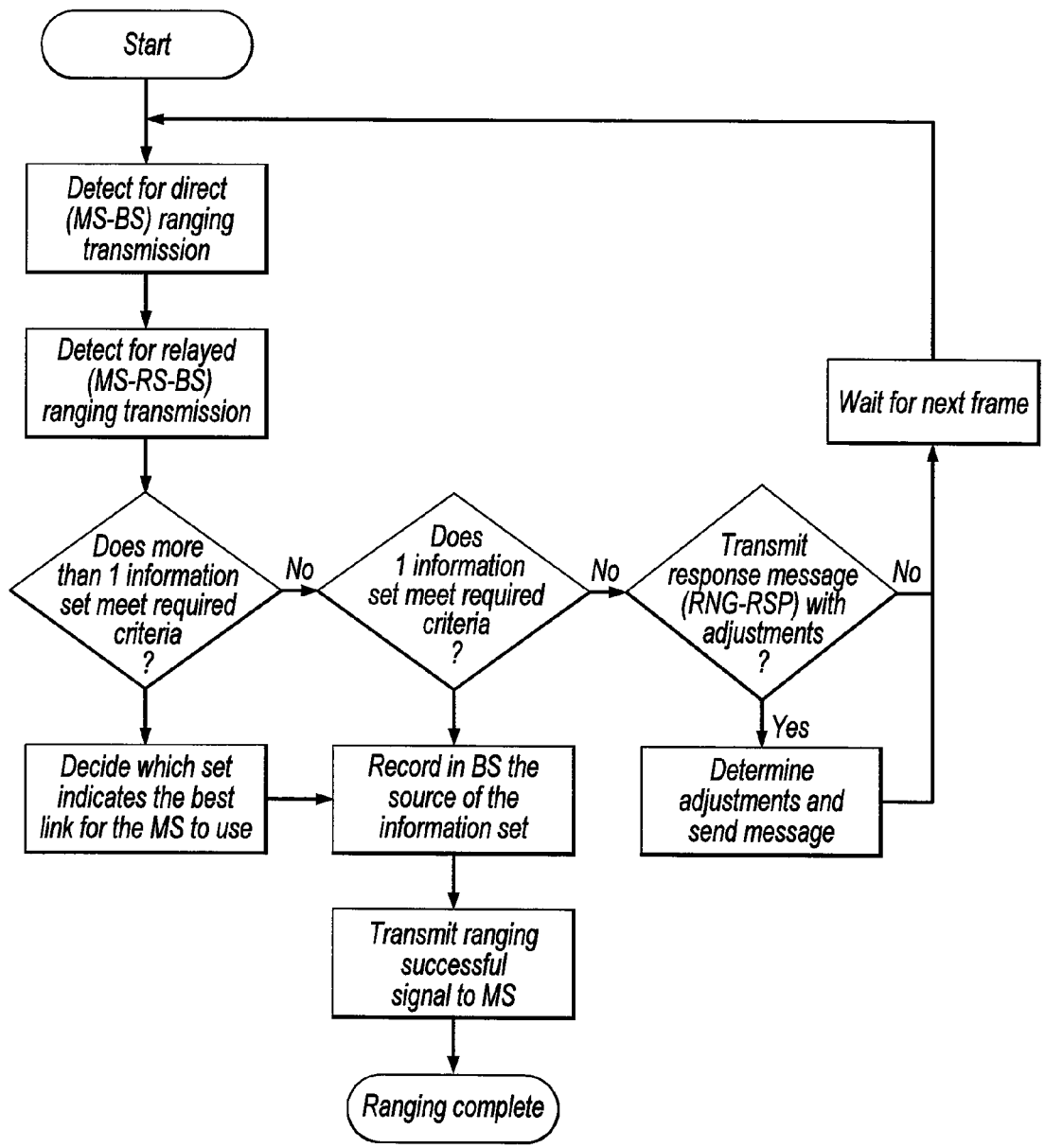
FIG. 4 shows an RS management procedure during an MS ranging process in a relay enabled network.

The procedure described in paragraph 3 is illustrated in FIG. 4. Here, (100) indicates the first message sent to the RS (or BS) by the MS or SS that is attempting to enter the network through the RS. If the RS detects (100) then in the same frame (or at a later instant) it sends a message (200) to the BS to request any information that is required to support this process and also inform the BS of the arrival of (100). The RS will then respond to the MS/SS with an appropriate message (300) which could be for example a continue message and include information to the MS/SS such as adjustments to make to its next transmission. The BS will also respond to (200) to acknowledge and provide any of the requested information in (200), as shown with (400).

At some point later in time the MS/SS may transmit another message (500). If this is still not sufficient from the RS perspective it may respond with another continue and adjustment message such as (300). However, once it eventually receives a sufficient message (500) the RS will conclude the ranging process. At this point it will notify the BS with a message (600) and may also request information required for the following stages of network entry in another message (700). The RS will then inform the MS/SS of successful completion of the ranging process through another message (800).

Note that in the case the first transmission from the MS/SS (100) is sufficient from the RS point of view then the messages between the RS and BS will still be exchanged (i.e. (200)(400)(600)(700)), however the RS and MS will obviously skip messages (300) and (500).

Alternatively, in a multi-hop configuration, multiple RS may be interposed in the communication path between the MS/SS and BS. In such a case, the above procedure is modified to include one RS receiving, and/or relaying, a ranging code or detection information from/to another RS, so that more than two process will occur in parallel, independently managed by the respective RS.

In the above description, it is assumed that the network could consist of some legacy BS (i.e., base stations operating in compliance with existing protocols) and some relaying enabled BS (i.e., base stations operating as described herein). It is also assumed that a relaying enabled BS may be operating in a legacy mode until it receives a request from an RS for it to enter the network. The reason the BS may operate in such a mode would be to preserve transmission resources by not having to broadcast relay specific information when there are no relays benefiting from the transmission.

Remaining Network Entry Processes

Once the RS has knowledge of the MS entering the network, it is possible for it to completely manage the remaining steps in the network entry process. It can then source information or inform the BS of the status of the procedure as and when required in such a way that the process between the RS and MS is optimized in terms of not introducing any extra latency.

For example, assuming that the RS has undergone authorization with the BS, the RS can locally manage the authorization process, informing the BS of the status, and sourcing any centrally held information as required from any centrally located servers that manage the authorization within the network.

As described above, particular embodiments of the present invention may provide one or more of the following effects:

Define a ranging and network entry procedure that effectively consists of two or more (depending on number of links) processes occurring in parallel and independently managed by the RS to which the connection is being sought;

Minimize the latency that would be associated with network entry due to the local management of the process;

Provide a scalable solution that enables a system to support potentially a large number of hops with no significant or, at worst, limited impact on network entry performance.

Embodiments of the present invention may be implemented in hardware, or as software modules running on one or more control processors, or on a combination thereof. That is, those skilled in the art will appreciate that a microprocessor or digital signal processor (DSP) may be used in practice to implement some or all of the functionality of a transmitter embodying the present invention. The invention may also be embodied as one or more device or apparatus programs (e.g. computer programs and computer program products) for carrying out part or all of any of the methods described herein. Such programs embodying the present invention may be stored on computer-readable media, or could, for example, be in the form of one or more signals. Such signals may be data signals downloadable from an Internet website, or provided on a carrier signal, or in any other form. A program embodying the invention could also be used to add the functionality of the RS as described above to a MS/SS having suitable hardware.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A transmission method for use in a wireless communication system, the system comprising a source apparatus, and a network including a destination apparatus and an intermediate apparatus, the destination apparatus being arranged to transmit and receive communications via the intermediate apparatus, at least the source apparatus being arranged to perform a network entry process in order to enter the network and thereafter to transmit and receive the communications via the intermediate apparatus, the method comprising:

in the source apparatus, attempting to enter the network through the intermediate apparatus by transmitting a ranging code; and in the intermediate apparatus, independently and locally managing the network entry process conducted by the intermediate apparatus with the source apparatus and conducting, in parallel with the network entry process, a guidance process between the destination apparatus and the intermediate apparatus to support the network entry process by:

in the intermediate apparatus:

detecting the ranging code transmitted from the source apparatus;

as soon as the intermediate apparatus has knowledge of the source apparatus attempting to join the network by said detecting, transmitting, to the destination apparatus, a request for information as part of the guidance process; and without waiting to receive the requested information in a return message from the destination apparatus, transmitting a message indicating continuation and/or adjustment information to the source apparatus to conduct the network entry process.

2. The transmission method according to claim 1, wherein following a successful detection of said ranging code, said intermediate apparatus manages the rest of the network entry process with the source apparatus.

3. The transmission method according to claim 1, wherein said return message from the destination apparatus to the intermediate apparatus informs the intermediate apparatus of whether the connection can be supported.

4. The transmission method according to claim 1, wherein said return message from the destination apparatus to the intermediate apparatus informs the intermediate apparatus of a connection type and/or service level available to the source apparatus via the intermediate apparatus.

5. The transmission method according to claim 4, wherein the intermediate apparatus uses said return message to determine whether to continue with the network entry process.

6. The transmission method according to claim 1, wherein the source apparatus is a subscriber station and the destination apparatus is a base station.

7. The transmission method according to claim 1, wherein the intermediate apparatus is a relay station arranged in a two-hop configuration between the source apparatus and the destination apparatus.

8. The transmission method according to claim 1, wherein the intermediate apparatus is constituted by a plurality of relay stations arranged in a multi-hop configuration between the source apparatus and the destination apparatus, a first of the relay stations detecting the initiation of the network entry process by the source apparatus and relaying said request for information to another of the relay stations for forwarding to the destination apparatus.

9. A wireless communication system comprising a source apparatus, and a network including a destination apparatus and an intermediate apparatus, destination apparatus being arranged to transmit and receive communications via the intermediate apparatus, at least the source apparatus being arranged to perform a network entry process in order to enter the network and thereafter to transmit and receive the communications via the intermediate apparatus, wherein:
 the source apparatus is arranged for attempting to enter the network through the intermediate apparatus by transmitting a ranging code;
 the intermediate apparatus is arranged for independently and locally managing the network entry process conducted by the intermediate apparatus with the source apparatus and conducting, in parallel with the network entry process, a guidance process between the destination apparatus and the intermediate apparatus to support the network entry process by:
 detecting the ranging code transmitted from the source apparatus;
 as soon as the intermediate apparatus has knowledge of the source apparatus attempting to join the network by said detecting, transmitting, to the destination apparatus, a request for information to support the network entry process as part of the guidance process; and
 without waiting to receive the requested information in a return message from the destination apparatus, transmitting a message indicating continuation and/or adjustment information to the source apparatus to conduct the network entry process; and
 the destination apparatus includes means for responding to said request with said return message to the intermediate apparatus, said return message being used by said managing means to facilitate completion of the network entry process.

10. Intermediate apparatus for use in a wireless communication system in which the intermediate apparatus forms a network with a destination apparatus arranged to transmit and receive communications via the intermediate apparatus, the system further comprising a source apparatus which is required to perform a network entry process by transmitting a ranging code in order to enter the network prior to transmitting and receiving the communications via the intermediate apparatus, wherein the intermediate apparatus is arranged for independently and locally managing the network entry process conducted by the intermediate apparatus with the source apparatus and for conducting, in parallel with the network entry process, a guidance process between the destination apparatus and the intermediate apparatus to support the network entry process, the intermediate apparatus including:
 means for detecting the ranging code transmitted from the source apparatus;
 means for, as soon as said detecting means detects that the source apparatus is attempting to join the network, transmitting to the destination apparatus a request for information to support the network entry process, as part of the guidance process;
 means for receiving the requested information in a return message from the destination apparatus; and
 means for transmitting, without waiting to receive the request information, a message indicating continuation and/or adjustment information to the source apparatus to conduct the network entry process.

11. Intermediate apparatus according to claim 10 in the form of a single relay station for use in a two-hop configuration with the source apparatus and the destination apparatus.

12. Intermediate apparatus according to claim 10 in the form of a plurality of relay stations for use in a multi-hop configuration between the source apparatus and the destination apparatus.

13. A non-transitory computer readable medium recording a computer program for execution by intermediate apparatus in a wireless communication system the intermediate apparatus forming a network with a destination apparatus which is arranged to transmit and receive communications via the intermediate apparatus, and the system further comprising a source apparatus which is required to perform a network entry process by transmitting a ranging code in order to enter the network prior to transmitting and receiving the communications via the intermediate apparatus arranging the intermediate apparatus for independently and locally managing the network entry process conducted by the intermediate apparatus with the source apparatus and for conducting, in parallel with the network entry process, a guidance process between the destination apparatus and the intermediate apparatus to support the network entry process, by providing the intermediate apparatus with the functions of:
 detecting the ranging code transmitted from the source apparatus;
 as soon as said detecting detects that the source apparatus is attempting to join the network, transmitting to the destination apparatus a request for information to support the network entry process, as part of the guidance process; and
 without waiting to receive the requested information in a return message from the destination apparatus, transmitting a message indicating continuation and/or adjustment information to the source apparatus to conduct the network entry process.

* * * * *